United States Patent [19]

Konstant

[11] Patent Number: 4,982,851
[45] Date of Patent: Jan. 8, 1991

[54] SUPPORTED PALLET RACK

[76] Inventor: Anthony N. Konstant, 920 Fisher La., Winnetka, Ill. 60093

[21] Appl. No.: 476,742

[22] Filed: Feb. 7, 1990

[51] Int. Cl.$^5$ ............................................. A47F 5/00
[52] U.S. Cl. .................................. 211/151; 211/162; 414/276
[58] Field of Search .................. 211/151, 162, 59.2; 414/276, 267, 286

[56] References Cited

U.S. PATENT DOCUMENTS

| | | | |
|---|---|---|---|
| 4,341,313 | 7/1982 | Doring | 211/151 |
| 4,462,500 | 7/1984 | Konstant et al. | 211/151 |
| 4,613,270 | 9/1986 | Konstant et al. | 211/151 X |
| 4,687,404 | 8/1987 | Seiz et al. | 211/151 X |
| 4,715,765 | 12/1987 | Agnoff | 211/151 X |
| 4,773,546 | 9/1988 | Konstant | 211/151 |

Primary Examiner—Robert W. Gibson, Jr.
Attorney, Agent, or Firm—Gerstman & Ellis, Ltd.

[57] ABSTRACT

A pallet rack comprises a least one pair of spaced, parallel rails and at least one wheeled cart mounted in rolling relation with the pair of rails and defining a load-carrying area. By this invention a cross brace extends between the rails, being positioned to support the bottom of a weak or poorly placed pallet placed on the rails adjacent the front end. The cross brace defines a space adjacent each of the rails to permit the front end of the cart to roll to the front end of the rails between the cross brace and each rail. The cart comprises a pair of wheel-carrying side members positioned parallel to the rails, plus transverse support members connecting the side members. The transverse support members are spaced from the cart front end by a distance sufficient to allow the front end of the cart to roll between the cross brace and each rail.

7 Claims, 1 Drawing Sheet

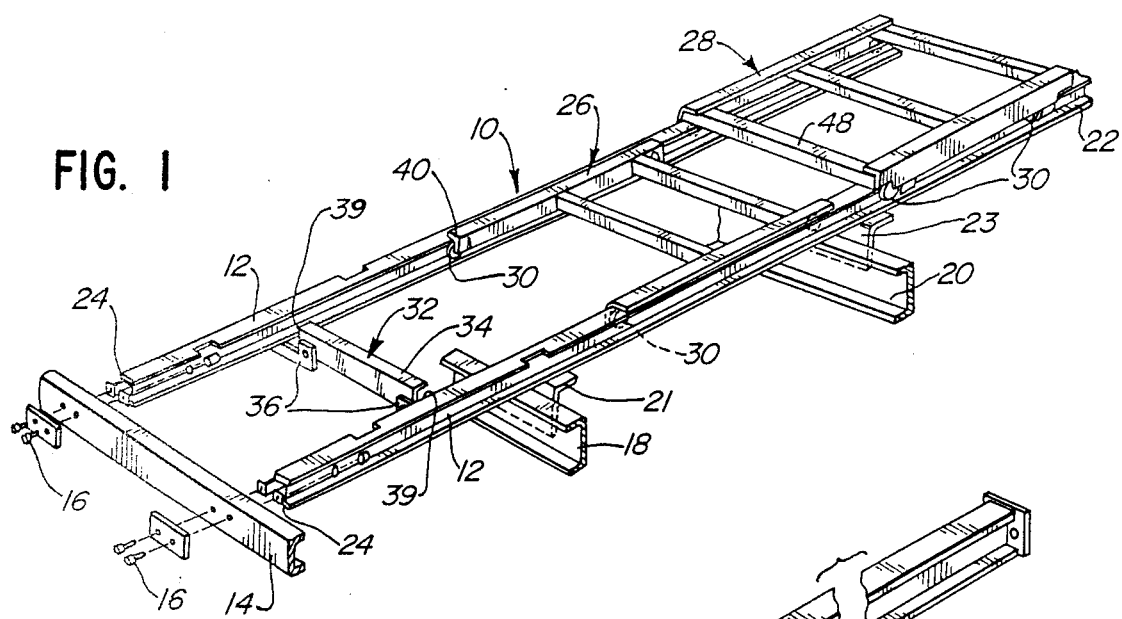
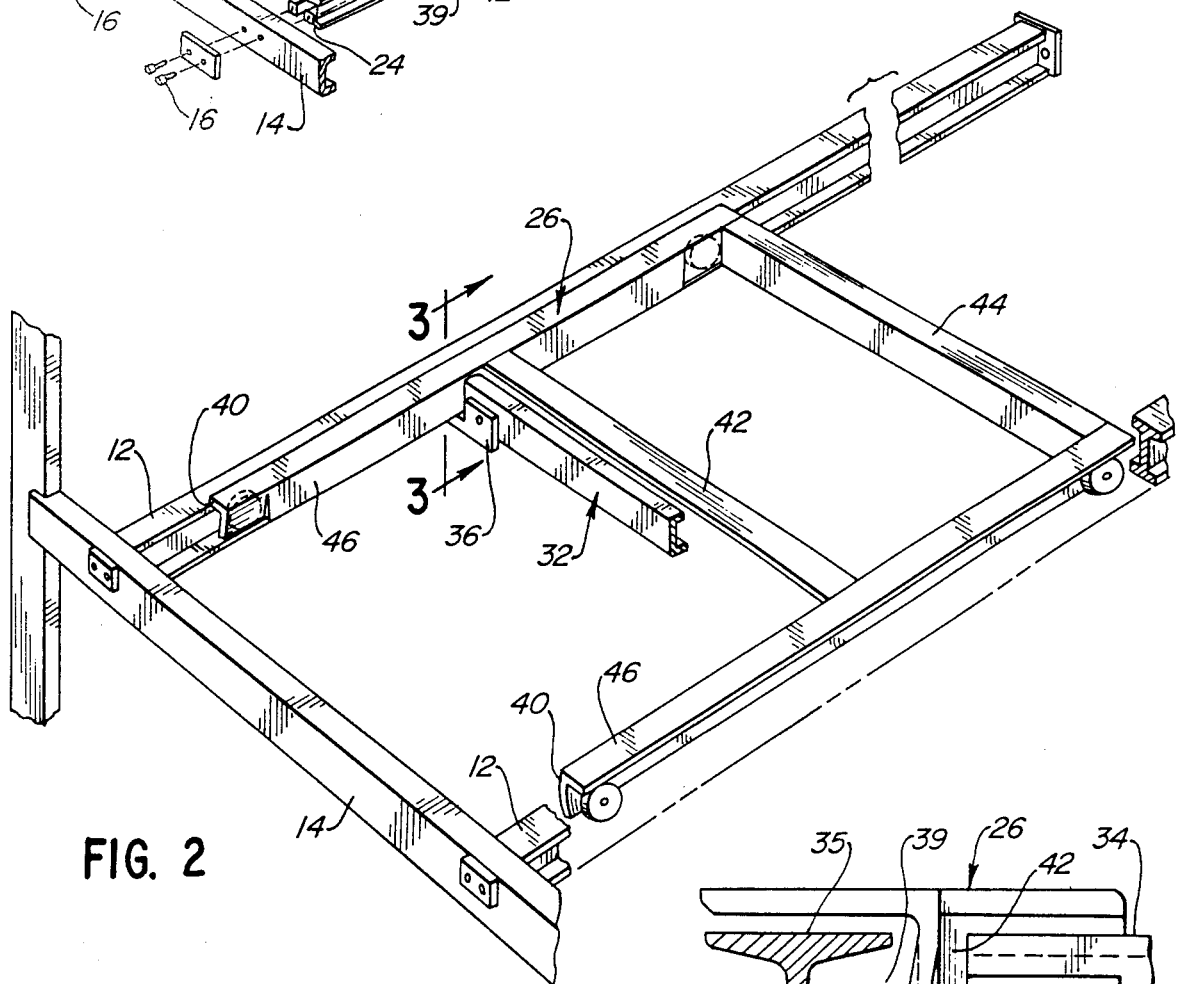
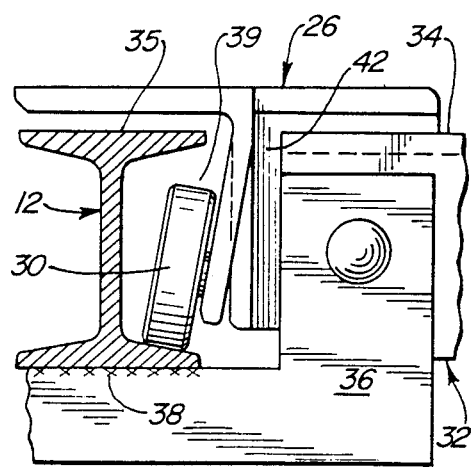

SUPPORTED PALLET RACK

BACKGROUND OF THE INVENTION

Pallet racks are used in warehouses and the like for storing pallets of merchandise, which pallets are typically made of a pair of wooden layers separated by vertical wooden boards called "stringers" In a typical operation, a lift truck will place a pallet on the rack for storage, where the rack comprises a pair of rails.

Multiple pallet racks are also known, in which the pallets, carrying a load of merchandise or other goods, may be placed on the front end of a rack, and then rolled rearwardly to make room for placement of another pallet and load. By such apparatus, improvements in warehouse storage procedures can be obtained, in that one may eliminate the number of aisles which extend between storage bays, since each pallet may be installed at the front end of the bay and moved rearwardly for storage. For example, see Döring U.S. Pat. No. 4,341,313, and Konstant U.S. Pat, Nos. 4,462,500 and 4,773,546.

When access to a rearwardly positioned pallet is desired in a multiple pallet rack system, one may simply remove the pallet or pallets in front of it with a lift truck or the like to cause the rearwardly positioned pallet to roll to the lift truck for access. Thus, such systems can have a greater storage density of pallets when compared with prior systems.

However, a problem exists in warehouse storage in that pallets are usually used and reused until they are old and weakened. A fully loaded pallet can sag in the middle as its wooden structure splits and deteriorates, so that the unsupported pallet can ultimately collapse, causing its load to drop through the remnants of the pallet. This is less likely to happen when the pallet is being handled by a lift truck, since the prongs of the fork lift move between the two horizontal layers of the pallet and provide added support. However, when the fork of the lift truck is withdrawn, and the pallet is sitting in unsupported or precarious manner on a pair of rails, there is the possibility in some circumstances that a weakened, fully loaded pallet may collapse.

While it would be desirable to provide a cross brace between the respective tracks on which the pallet rests to provide additional support, this is not feasible in the situation of a multiple pallet rack which makes use of one or more rolling carts, since if the cross brace between the two tracks is high enough to provide good support to the pallets, it is also high enough to impede the rolling of the cart into a forward position, at which the cart receives a pallet from, or delivers a pallet to, a fork lift truck.

By this invention, an improvement in pallet racks provides the desired support to particularly the forward pallet storage position of a multiple pallet rack, where the pallet resides on the rails after the cart or carts present have been loaded with pallets and have been pushed to the rear. Thus, the supported pallet rack of this invention is considerably safer than corresponding pallet racks of the prior art, since a collapse of a pallet can actually have fatal consequences if someone is underneath it at the time. Also, the avoidance of such collapse can likewise avoid damage to merchandise, time- consuming clean up operations, and the like.

DESCRIPTION OF THE INVENTION

In this invention a pallet rack is provided which comprises at least one pair of spaced, parallel rails and at least one wheeled cart mounted in rolling relation with the pair of rails and defining a load-carrying area.

By the improvement of this invention, cross brace means is provided, extending between the rails and positioned to support the bottom of a weak or poorly placed pallet placed on the rails adjacent the front end of the rails. The cross brace means also defines a space adjacent each of the rails to permit the front end of the wheeled cart to roll toward the front end of the rails between the cross brace means and each rail.

Also, the cart comprises a pair of wheel-carrying side members positioned parallel to the rails, plus transverse support member means connecting the side members. The transverse support member means are spaced from the cart front end by a distance sufficient to allow the front end of the cart to roll between the cross brace means and each rail. Thus, the desired transverse support for pallets may be provided in a first area nearest the fork lift truck, where the pallets are stored on the rails themselves. The cross brace is preferably positioned to be spaced from the front end of the rails by about one half a pallet length of the particular pallets to be stored on the rack, so that a generally central area of the pallets may be supported by the cross brace.

As is conventional, the cart or carts may also carry centrally positioned transverse support members so that pallet carried thereon may be likewise centrally supported.

It is preferred for at least the first third of each of the cart side members nearest the cart front end to be free of connection with the transverse support member means. In other words, the front end of at least the first cart used herein comprise wheel carrying side members lacking a transverse support member at the forward cart end. The first transverse support member is rather centrally positioned, preferably about half way along the length of the cart. Thus, the cart may be rolled into its forwardmost position for receipt of a pallet by a lift truck, with the forward portions of the side members passing between each of the rails and the cross brace means attached between the rails, so that the cart can be advanced without interference to the desired position.

Preferably, the rails define a bottom surface, with a bracket carried by each rail in connection with the bottom surface. Each bracket carries an end of the cross brace means in inwardly spaced relation with each rail to provide the desired spacing described above.

Thus, a pallet rack is provided in which the lowest pallet can be moved to a full forward position over a cross brace which extends between the rails, while the cross brace is still provided to support pallets positioned on the rails in that forward position.

DESCRIPTION OF THE DRAWINGS

In the drawings, FIG. 1 is a perspective view of a multiple pallet rack which carries two rolling carts for receiving and supporting pallets, the rolling carts being capable of rolling to a full forward position in overlying relation with each other.

FIG. 2 is an enlarged, fragmentary perspective view of the device of FIG. 1, showing the lower cart in its forward position.

FIG. 3 is a fragmentary sectional view taken along line 3—3 of FIG. 2.

DESCRIPTION OF SPECIFIC EMBODIMENTS

The embodiment shown in the drawings is similar to an embodiment shown in Konstant U.S. Pat. No. 4,773,546, except for the modifications as described herein.

Referring to the drawings, pallet rack 10 is shown which comprises at least one pair of spaced, parallel rails 12, which are shown to be of I-beam construction. Rails 12 are supported at their front end 24 by beams 14, being bolted thereto by bolts 16 as shown in exploded view in FIG. 1. Rails 12 are, and being supported along their length by other beams 18, 20 (shown in fragmentary form only) through brackets 21, 23, which brackets may be positioned to slightly elevate the rear end 22 of rails 12 with respect to the front end 24, so that the carts carried thereon tend to naturally roll toward front end 24.

A pair of overlying carts 26, 28 are shown, being of a design essentially identical to the Konstant Patent as described above, except for the modification shown. Specifically, the respective carts each carry wheels 30, with the wheels of cart 26 rolling on one side of the I-beam rails 12 and the wheels of cart 28 rolling on the other. Cart 28 is positioned to be higher than cart 26, so that it can roll over cart 26 with both of them residing at front end 24 in a stack-like array.

Cross brace 32, specifically shown to be made of a piece of channel iron, is carried at a position between rails 12, with the upper surface 34 of the cross brace being typically of substantially equal level to the upper surface 35 of rail 12. See FIG. 3.

Thus, the particular pallet rack 10 of this embodiment may store three pallets. The first pallet is placed upon upper cart 28 when it is in a position next to front end 24 of the rails. Then, when another pallet is to be applied, cart 28 is pushed rearwardly by that second pallet as the lift truck deposits it on lower cart 26. Then, when the third pallet is to be added, the lift truck uses the third pallet to push the second pallet and lower cart 26 rearwardly, and to deposit the third pallet on the front end of rail 12. Cross brace 32 is positioned approximately midway along the length of the third pallet position, to support it and to reduce the possibility of collapse thereof when the fork of the fork lift truck has been withdrawn.

Cross brace 32 is secured by bolts or the like at each end to a pair of L-shaped brackets 36, each of which may be welded to the bottom of its respective rail 12 along weld line 38, as shown in FIG. 3. Accordingly, cross brace 32 is inwardly spaced from each of the rails, so that the respective spaces 39 are present, to permit the front end 40 of cart 26 to pass between each rail 12 and cross brace 32, as particularly shown in FIG. 3. This is possible because of the absence of a forwardly positioned transverse support member carried on cart 26. Instead, the forwardmost transverse support member 42 of cart 26 is specifically shown to be positioned about half way between front end of 40 of cart 26 and the transverse support member 44 positioned at the rear end of cart 26. Cart 26 is thus of roughly the shape of a squared-off letter A, with the forward portion of wheel-carrying side members 46 being free of cross brace support. Thus, cart 26 is capable of forward advancement until cross brace 32, positioned between the rails, is engaged by transverse support member 42, carried by the cart.

Because of this, a double advantage is obtained, in that the pallet which rests directly on rail 12 at the forwardmost position can be transversely supported against collapse by cross brace 32. At the same time, cart 26 remains capable of full advancement to a forward position so it can receive a pallet, prior to being rolled back to expose the rails to receive another pallet. Upper cart 28, when present, generally does not need to have the modified design of lower cart 26, in those circumstances where cross brace 32 is not substantially higher than the height of the rails 12, since under those normal circumstances upper cart 28 can roll over cross brace 32 even though it has a forwardly positioned transverse support member 48. Crossbar 42 of cart 26 also provides central support to pallets carried thereon.

The supported pallet rack of this invention may be used in the absence of upper cart 28, or, in the alternative, additional rolling carts may be provided if desired.

The above has been offered for illustrative purposes only, and is not intended to limit the scope of the invention of this application which is as defined in the claims below.

That which is claimed is:

1. In a pallet rack which comprises at least one pair of spaced, parallel rails, and at least one wheeled cart mounted in rolling relation with said pair of rails and defining a load-carrying area, the improvement comprising, in combination:

said rails and cart each defining a front end; cross brace means extending between said rails and positioned to support the bottom of a pallet placed on said rails adjacent said front end, said cross brace means defining a space adjacent each of said rails to permit the front end of said cart to roll toward the front end of said rails between the cross brace means and each rail; said cart comprising a pair of wheel-carrying side members positioned parallel to said rails and transverse support member means connecting said side members, said transverse support member means being spaced from the cart front end by a distance sufficient to allow said front end of the cart to roll between the cross brace means and each rail.

2. The pallet rack of Claim 1 in which at least the first third of each of said side members nearest the cart front end is free of connection with said transverse support member means.

3. The pallet rack of Claim 1 in which said rails define a bottom surface, and a bracket carried by each rail in connection with said bottom surface, each bracket carrying an end of the cross brace means in inwardly spaced relation with each rail.

4. The pallet rack of Claim 1 in which said cross brace means is spaced from the front end of the rails by about one half a pallet length.

5. In a pallet rack which comprises at least one pair of spaced, parallel rails and at least one wheeled cart mounted in rolling relation with said pair of rails and defining a load-carrying area, the improvement comprising, in combination:

said rails and cart each defining a front end; cross brace means extending between said rails and positioned to support the bottom of a pallet placed on said rails adjacent said front end, in which said rails define a bottom surface, a bracket carried by each rail in connection with said bottom surface, each bracket carrying an end of the cross brace means in inwardly spaced relation with each rail whereby said cross brace means defines a space adjacent each of said rails to permit the front end of said cart to roll toward the front end of the rails between the cross brace means and each rail; said cart comprising a pair of wheelcarrying side members positioned parallel to said rails and transverse support member means connecting said side members, said transverse support member means being spaced from the cart front end by at least one third of the length of said side members, to allow said front end of the cart to roll between the cross brace means and each rail.

6. The pallet rack of Claim 5 in which said cross brace means is spaced from the front end of said rails by about one half a pallet length.

7. In a pallet rack which comprises at least one pair of spaced, parallel rails, and at least one wheeled cart mounted in rolling relation with said pair of rails and defining load-carrying area, the improvement comprising, in combination:

said rails and cart each defining a front end; cross brace means extending between said rails and positioned to support the bottom of a pallet placed on said rails adjacent said front end, said cross brace means being spaced from the front end of the rails by about one half a pallet length, said cross brace means defining a space adjacent each of said rails to permit the front end of said cart to roll toward the front end of said rails between the cross brace means and each rail;

said cart comprising a pair of wheel-carrying side members positioned parallel to said rails, and transverse support member means connecting said side members, at least the first third of each of said side members nearest the cart front end being free of connection with said transverse support member means, whereby the front end of the cart can roll between the cross brace means and each rail.

* * * * *